United States Patent
Thirumal et al.

(10) Patent No.: US 12,086,543 B2
(45) Date of Patent: Sep. 10, 2024

(54) RULE-BASED MACHINE LEARNING CLASSIFIER CREATION AND TRACKING PLATFORM FOR FEEDBACK TEXT ANALYSIS

(71) Applicant: Microsoft Technology Licensing, LLC, Redmond, WA (US)

(72) Inventors: Sathia Prabhu Thirumal, Bothell, WA (US); Christopher Lawrence Laterza, Issaquah, WA (US); Manoj Kumar Rawat, Bellevue, WA (US); Karan Singh Rekhi, Sammamish, WA (US); Natarajan Arumugam, Bothell, WA (US); Pranav Jayant Farswani, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 480 days.

(21) Appl. No.: 17/356,122

(22) Filed: Jun. 23, 2021

(65) Prior Publication Data
US 2022/0366139 A1    Nov. 17, 2022

Related U.S. Application Data

(63) Continuation of application No. 17/322,720, filed on May 17, 2021.

(51) Int. Cl.
G06F 40/279    (2020.01)
G06F 16/33    (2019.01)
(Continued)

(52) U.S. Cl.
CPC ........ *G06F 40/279* (2020.01); *G06F 16/3331* (2019.01); *G06F 16/338* (2019.01); *G06F 16/35* (2019.01); *G06N 20/00* (2019.01)

(58) Field of Classification Search
None
See application file for complete search history.

(56) References Cited

U.S. PATENT DOCUMENTS 9,723,145 B2    8/2017    Bell et al.
10,346,881 B2    7/2019    French et al.
(Continued)

FOREIGN PATENT DOCUMENTS

WO    2015009620 A1    1/2015
WO    2019182789 A1    9/2019

OTHER PUBLICATIONS

"Non Final Office Action Issued in U.S. Appl. No. 17/315,393", Mailed Date: Jul. 7, 2022, 13 Pages.
(Continued)

*Primary Examiner* — Stella L. Woo
(74) *Attorney, Agent, or Firm* — NovoTechIP International PLLC

(57) ABSTRACT

A system and method for creating a machine learning (ML) classifier for a database uses a weakly-supervised training data set created automatically from database items on the basis of a human-created keyword set. The automatically created training data set is used to construct one or more deep learning classifier checkpoints, which can then be compared with one another and with a classifier based on the original keyword set in order to select a classifier for use by other users viewing the database.

20 Claims, 9 Drawing Sheets

(51) Int. Cl.
*G06F 16/338* (2019.01)
*G06F 16/35* (2019.01)
*G06N 20/00* (2019.01)

(56) References Cited

U.S. PATENT DOCUMENTS

| | | | |
|---|---|---|---|
| 11,269,898 B1* | 3/2022 | Salaka | G06N 20/20 |
| 11,537,506 B1* | 12/2022 | Dasgupta | G06F 11/1476 |
| 2013/0185291 A1 | 7/2013 | Tyndall | |
| 2014/0114648 A1 | 4/2014 | Eggink et al. | |
| 2014/0321290 A1* | 10/2014 | Jin | H04L 47/2441 |
| | | | 370/241 |
| 2015/0120390 A1 | 4/2015 | Pace | |
| 2015/0134404 A1 | 5/2015 | Gustafson et al. | |
| 2016/0034930 A1 | 2/2016 | Verschoor et al. | |
| 2016/0350886 A1* | 12/2016 | Jessen | G06Q 50/184 |
| 2017/0193392 A1 | 7/2017 | Liu et al. | |
| 2017/0308613 A1 | 10/2017 | Zhu et al. | |
| 2017/0372231 A1 | 12/2017 | Ghatage et al. | |
| 2019/0026964 A1 | 1/2019 | Papa et al. | |
| 2019/0121808 A1* | 4/2019 | Chadha | G06F 16/2365 |
| 2019/0244225 A1 | 8/2019 | Ravichandran | |
| 2020/0004816 A1 | 1/2020 | Kieser et al. | |
| 2020/0082415 A1 | 3/2020 | Laterza | |
| 2020/0250562 A1 | 8/2020 | Bly | |
| 2020/0286002 A1* | 9/2020 | Szanto | G06F 18/24 |
| 2020/0334570 A1 | 10/2020 | Franklin et al. | |
| 2020/0364233 A1* | 11/2020 | Chan | G06F 16/24578 |
| 2021/0065258 A1 | 3/2021 | Mohammad et al. | |
| 2021/0248136 A1* | 8/2021 | Panuganty | G06N 20/00 |
| 2021/0256324 A1 | 8/2021 | Yingrui | |
| 2021/0326371 A1* | 10/2021 | Bui | G06F 40/284 |
| 2022/0075809 A1 | 3/2022 | Fusco et al. | |
| 2022/0171818 A1* | 6/2022 | Gregori | G06F 16/35 |
| 2022/0358529 A1 | 11/2022 | Rawat et al. | |

OTHER PUBLICATIONS

Horner, Selena, "Net Promoter Score and Loyalty", Retrieved from: https://fotoinc.com/foto-blog/net-promoter-score-and-loyalty/, Aug. 23, 2018, 7 Pages.

"International Search Report and Written Opinion Issued in PCT Application No. PCT/US22/024136", Mailed Date: Jul. 12, 2022, 14 Pages.

"International Search Report and Written Opinion Issued in PCT Application No. PCT/US22/026085", Mailed Date: Jul. 13, 2022, 12 Pages.

"Notice of Allowance Issued in U.S. Appl. No. 17/315,393", Mailed Date: Jan. 19, 2023, 11 Pages.

Pickell, Devin, "What Is a Net Promoter Score An NPS Guide for 2020", In Survey Category, Oct. 10, 2018, 9 Pages.

Raassens, et al., "NPS and Online WOM: Investigating the Relationship Between Customers' Promoter Scores and eWOM Behavior", In Journal of Service Research, vol. 20, Issue 3, 2017, pp. 322-334.

"Non-Final Office Action Issued in U.S. Appl. No. 17/322,720", Mailed Date: Sep. 21, 2023, 7 Pages.

"6 Strategies to Improve Your NPS®", Retrieved from: https://web.archive.org/web/20200511080730/https:/www.hotjar.com/net-promoter-score/improve-nps/, May 11, 2020, 6 Pages.

"How to Update, Revise, and Review Your NPS Comments", Retrieved from: https://web.archive.org/web/20200815065705/https:/goascribe.com/reading-nps-comments/, Aug. 15, 2020, 6 Pages.

Diwan, Tanuj, "Increase Net Promoter Score with these 11 Surefire Strategies", Retrieved from: https://www.surveysensum.com/customer-experience/net-promoter-score/improve-net-promoter-score/, Nov. 19, 2019, 23 Pages.

Frampton, Sam, "How to Improve Your Net Promoter Score?", Retrieved from: https://chattermill.com/blog/How-to-Improve-net-promoter-score/, Aug. 16, 2018, 18 Pages.

Non-Final Office Action mailed on Feb. 16, 2024, in U.S. Appl. No. 17/322,720, 12 pages.

Notice of Allowance mailed on Apr. 25, 2024, in U.S. Appl. No. 17/322,720, 5 pages.

* cited by examiner

RULE-BASED MACHINE LEARNING CLASSIFIER CREATION AND TRACKING PLATFORM FOR FEEDBACK TEXT ANALYSIS

CROSS-REFERENCE TO RELATED APPLICATIONS

This application claims benefit of priority under 35 U.S.C. 120 as a continuation of U.S. patent application Ser. No. 17/322,720, filed May 17, 2021, which is incorporated by reference herein to the extent not inconsistent herewith.

TECHNICAL FIELD

This application is directed to methods and systems for creating machine learning (ML) classifiers and using them to analyze a database of text entries, for example a database of feedback text attached to survey results.

BACKGROUND

Large feedback corpora (i.e., databases of feedback results that may include text feedback and/or numerical ratings) require natural language processing (NLP) techniques to understand topic trends. Categorizing documents into known categories is the purview of supervised classification models, and such models have proven to be fundamental to tracking customer sentiment in relation to specific topics. However, creating supervised machine learning (ML) models requires labeled training data created by humans. Labeled training data involves categorizing feedback items in a feedback database as pertinent to a particular topic (or set of topics), and then directing an ML model to this manually created categorization data to develop a classifier to automatically determine the pertinence of other entries to the topic. Advanced modem modeling techniques that leverage neural networks typically require even more training data than traditional models. Labeling data for supervised learning is one of the largest bottlenecks in the development of these models.

SUMMARY

In one aspect, a system for viewing search results in a database includes a processor and machine-readable media including instructions. The instructions, when executed by the processor, cause the processor to display in a user interface (UI) a plurality of topics relevant to the database. The plurality of topics includes a keyword-based topic which is connected to a predetermined list of keywords and a machine-learning-based topic which is connected to a stored machine-learning classifier. For at least one displayed topic, if the displayed topic is a keyword-based topic, the instructions, when executed by the processor, cause the processor to perform a search of the database for the predetermined list of keywords and display the results of the search to a user. If the displayed topic is a machine-learning-based topic, the instructions, when executed by the processor, cause the processor to retrieve stored results of the stored machine-learning classifier and display the stored results to the user.

In another aspect, a method for viewing search results in a database includes displaying in a user interface (UI) a plurality of topics relevant to the database. The plurality of topics includes a keyword-based topic, which is connected to a predetermined list of keywords, and a machine-learning-based topic, which is connected to a stored machine-learning classifier. For at least one displayed topic, if the displayed topic is a keyword-based topic, the method includes performing a search of the database for the predetermined list of keywords and displaying the results of the search to a user. If the displayed topic is a machine-learning-based topic, the method includes retrieving stored results of the stored machine-learning classifier and displaying the stored results to the user.

In another aspect, a system for accessing, in a classifier database, machine learning (ML) classifiers pertaining to text entries in a text source database, includes a processor and machine-readable media including instructions. The instructions, when executed by the processor, cause the processor to receive from a user a request to search for ML classifiers relating to a specific topic, search the classifier database for ML classifiers matching the request to create a list of ML classifiers, send to the user the created list of ML classifiers, receive from the user a selected member of the created list of ML classifiers, and send to the user stored results of a search of the text source database using the selected member.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

As discussed above, labeling data for supervised learning is one of the largest technical problems in the development of machine learning (ML) models for data processing. Weakly supervised models for labeling data have been proposed in the past, but these may not be satisfactory for many situations. The present application provides a technical solution in the form of a new method for creating a large weakly supervised training set that can be used to construct deep learning classifiers more quickly and easily. The present application also provides technical solutions of systems for facilitating the construction of a human-validated validation set, and for viewing both keyword-based and deep learning-based topics pertaining to entries in a database.

The following description specifically describes this system in the context of classification of feedback in large feedback corpora, but it will be understood that the methods described herein are not limited solely to such corpora, but may be applied to other collections of data, especially data that includes free-form text information generated by individual users. For example, the present methods could be applied to a database of resumes and current and past job titles to analyze types of resume entries that are associated with holding or obtaining a particular job. If such a database includes numerical interview ratings, these could be used similarly to the feedback ratings described below in order to examine entries. The present methods could also be used to categorize news articles into predefined categories, such as politics, sports, fashion, technology, or other categories.

As used herein, a "classifier" is a set of rules used to determine pertinence of a topic. Classifiers may be keyword based, for example determining a topic to be pertinent or nonpertinent based on whether any words in a feedback entry are contained within a selected keyword list. ML classifiers may also be intrinsically keyword-based, but they may use a much more nuanced algorithm. In some implementations, some text classification models are able to recognize semantic similarity in a way that keyword models cannot, for example by recognizing misspellings, typographical errors, and synonyms.

Figure 1:
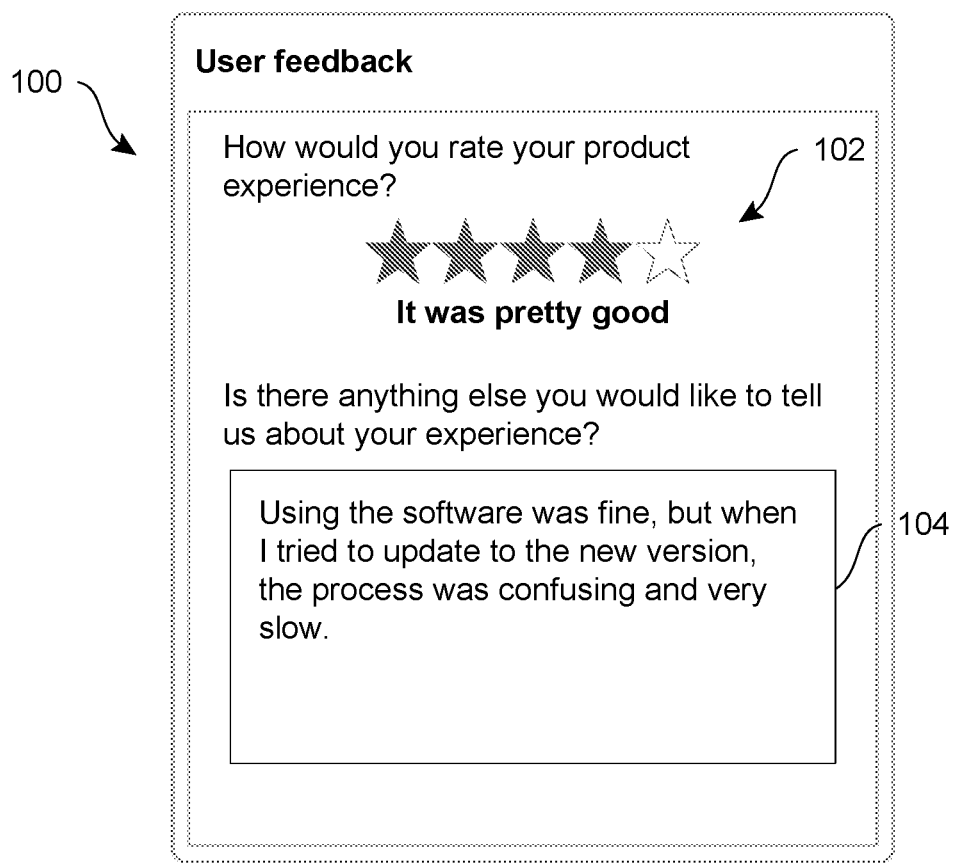
FIG. 1 shows an example entry in a database of user feedback.

FIG. 1 shows a typical entry 100 in a database of user feedback. The entry includes a rating 102 of the product (shown as 4 out of 5 stars, with a text explanation of the meaning of the star rating), and a free-text entry 104 commenting on the product and/or the reasons for the rating (sometimes referred to as a "verbatim"). Databases of this type of feedback are widely created for many different products and experiences and can be very large. They are rich sources of information about the products and experiences being rated, but extracting information from them can be difficult because of their size. The present disclosure provides methods of improving searches of such feedback corpora to gain information about the types of problems that users are experiencing with the product or opportunities for improvement of the product.

Figure 2:
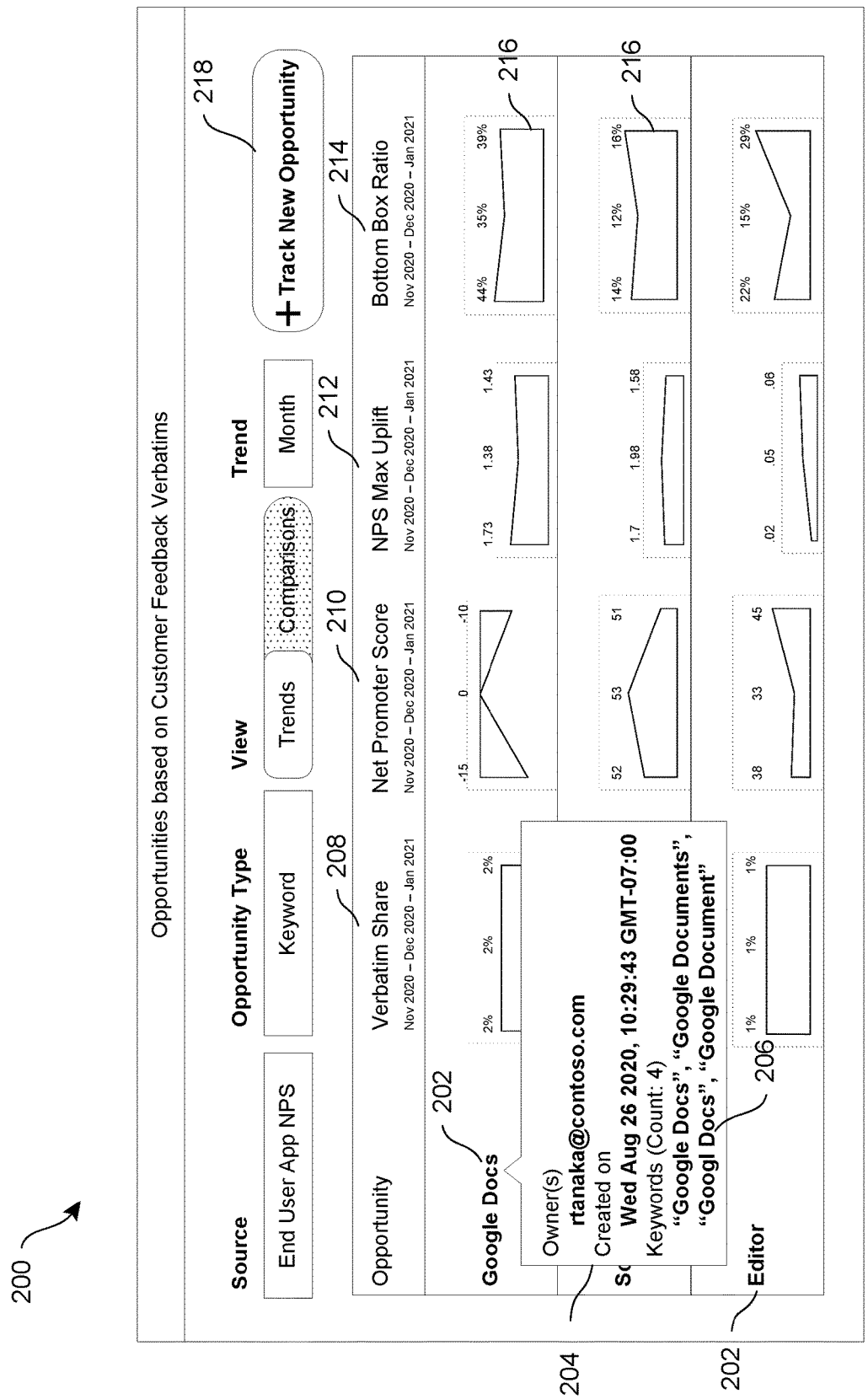
FIG. 2 shows a user interface (UI) for performing keyword-based searches of opportunities in a feedback database.

FIG. 2 shows a user interface (UI) 200 where a user (for example, a nonexpert user) may browse a feedback database for trends. UI 200 shows how a user may examine opportunities 202 (i.e., topics) in the database using a keyword-based search. UI 200 shows only keyword-based topics; browsing of ML topics is shown below at FIG. 5. Opportunities 202 are shown in a first column, and an explanatory tooltip 204 is shown when the user hovers a mouse over an opportunity. Tooltip 204 shows keywords 206 pertaining to the opportunity (which has been previously created and named by another user), and may also include information such as an identifier of the user who created the opportunity and the time that it was created. Subsequent columns include various metrics for feedback verbatims, including verbatim share 208 (fraction of verbatims matching the keywords), net promoter score (NPS) 210 (a measure of approval from ratings paired with verbatims matching the keywords), NPS max uplift 212 (a measure of negative sentiment), and bottom box ratio 214 (a measure of fraction of verbatims matching the keywords that are paired with poor numerical ratings). Details of the listed metrics may be found in copending and commonly owned U.S. patent application Ser. No. 17/315,393, filed 2021 May 10, which is incorporated herein by reference to the extent not inconsistent herewith. In each column in the UI 200, a historical graph 216 of the value of the metric is shown. This view may be useful to a user who is trying to understand if a new version increased or decreased customer satisfaction related to a specific set of keywords, for example, by seeing if a metric changed at the time that the new version was deployed. The user may also perform a new search with a new set of keywords using the "track new opportunity" button 218, and the user may save this search for other users to access. In some implementations, a different or longer range of historical data can be accessed by clicking on graphs 216.

Figure 3:
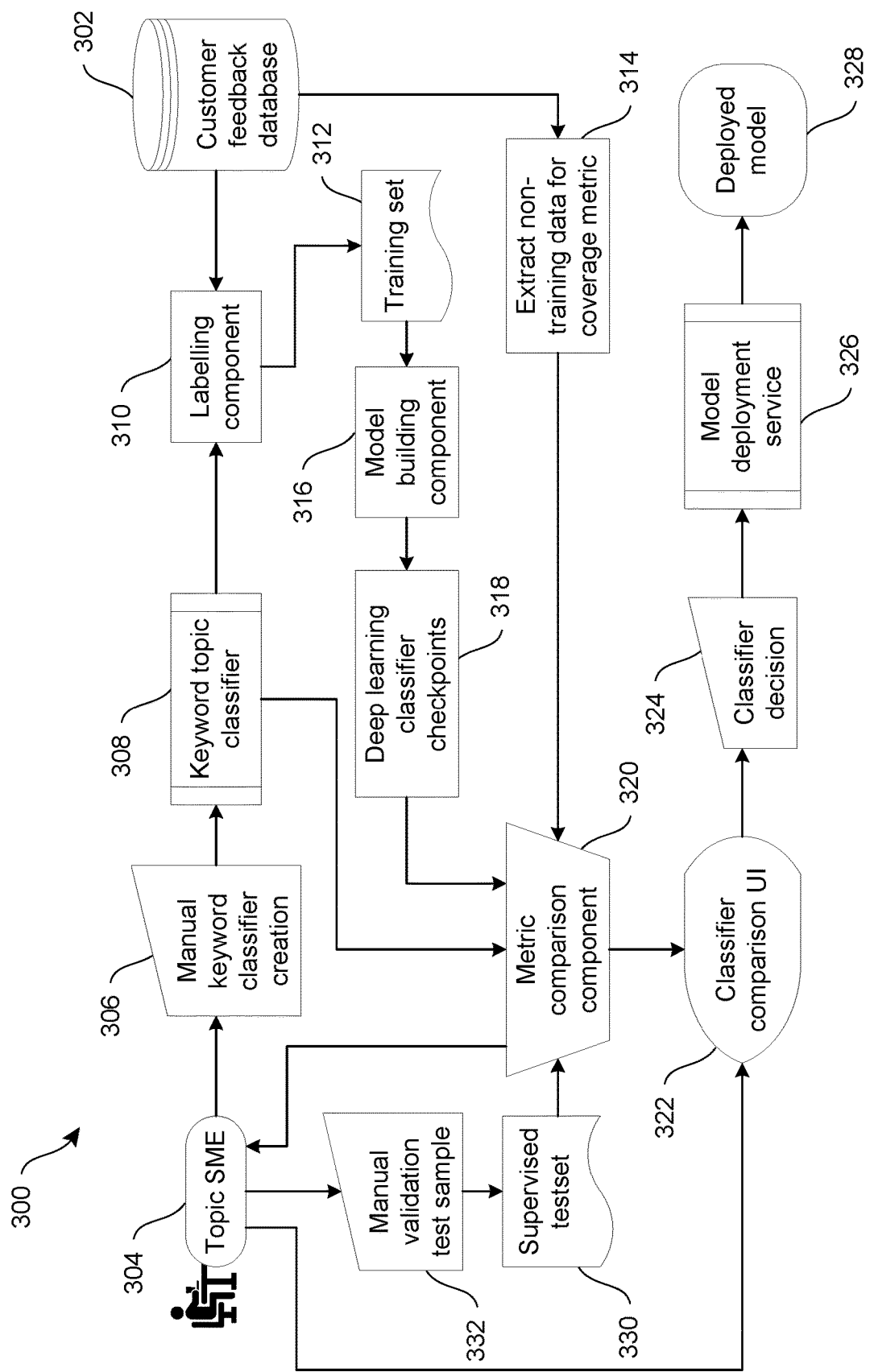
FIG. 3 is a flow diagram showing steps of creating a machine learning (ML) classifier for a particular topic in a feedback database.

The UI 200 may also be used to browse opportunities based on ML classifiers, instead of simple keyword classifiers. FIG. 3 shows the process of creating such a classifier, and FIG. 5 below will show a UI for browsing ML classifiers for the feedback database. FIG. 3 is a flow diagram 300 showing steps of creating a classifier for a particular topic in the customer feedback database 302 for which FIG. 1 shows a typical entry. In the process, a user 304 (who is preferably a subject matter expert but may be any user) begins by creating a name and a list of keywords 306 for a desired topic. It will be understood that while a single user 304 is shown in FIG. 3, various tasks described herein as being performed by this user may be allocated to multiple users. For example, one user 304 might generate keyword list for classifier creation in step 306, and a different user might create the manual validation set 332 described below.

In step 306, keywords are then transformed into a simple classifier, described herein as "keyword topic classifier" 308. The keyword topic classifier 308 is a simple "rule" for determining whether a particular feedback item is or is not pertinent to the topic being created, where the rule is simply to check if the feedback contains a word on the user-created keyword list.

Figure 4:
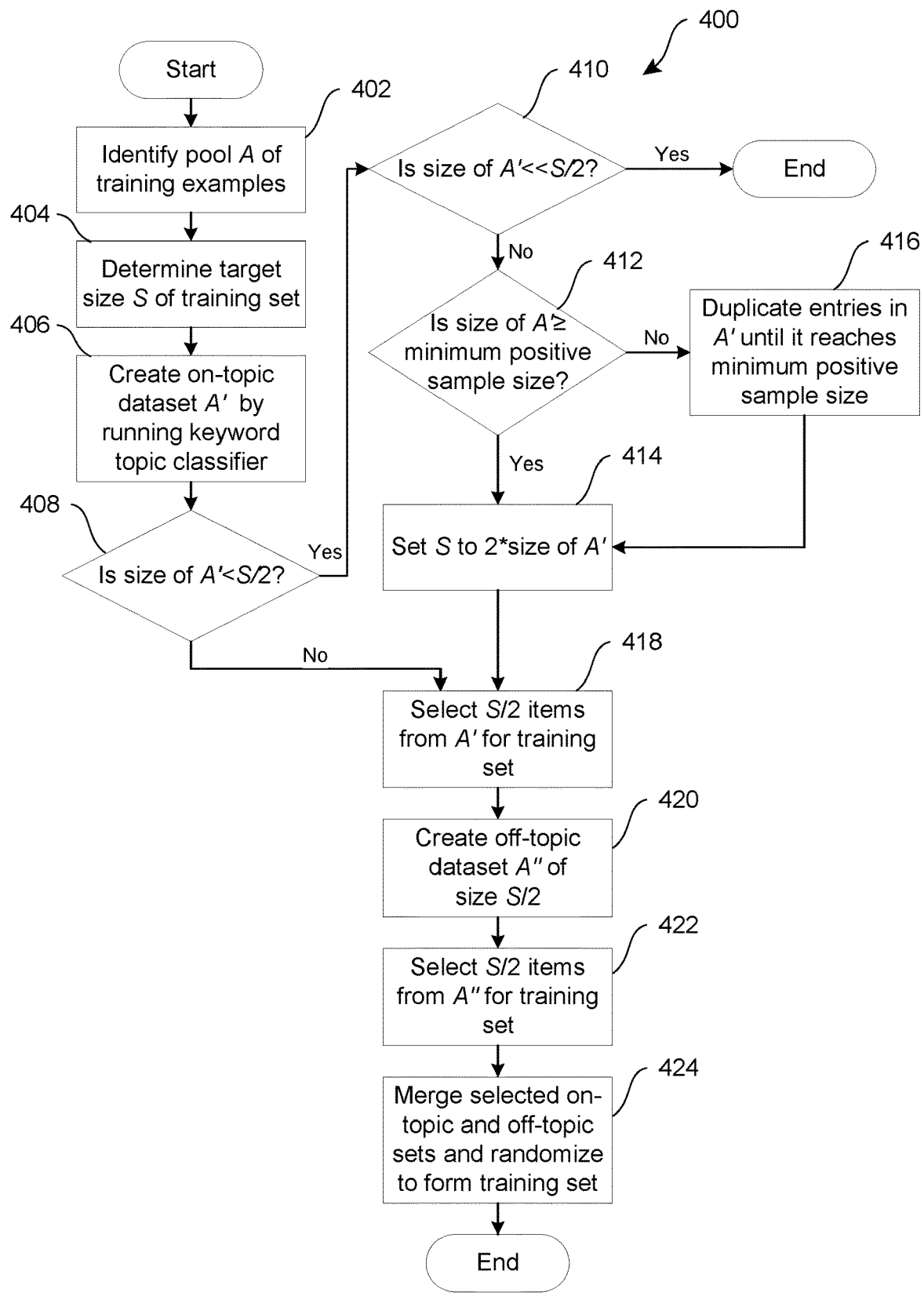
FIG. 4 is a flow diagram showing steps of constructing a training set using an auto-label component.

Labeling component 310 processes customer feedback database 302 to create training set 312. Training set 312 is considered to be weakly supervised because it is automatically created based on keyword topic classifier 308, rather than manually created by a human expert. FIG. 4 is a flow diagram showing this process. Auto-label component 310 starts by identifying a pool of possible training examples A from customer feedback database 302 (step 402) and determines a training set size S (step 404), which may be a default value, a value specified by user 304, or a value determined by some other appropriate method. In some implementations, A is in excess of 100,000 data points and S is in the range of about 10,000 to about 40,000 examples, but those of ordinary skill in the art will understand how to determine appropriate sizes for A and for S. Auto-label component 310 then runs keyword topic classifier 308 on A to create an all on-topic dataset A' (step 406). In some preferred implementations, auto-label component 310 also determines a relative frequency distribution FD for A' of keywords in the keyword topic classifier 308. The process checks to see if the number of positive examples is substantially less than S/2 (step 410). If it is, the process stops, reporting that there are not enough positive examples to train on the topic. In this case, user 304 may add keywords to try to improve the topic classification.

If the number of positive examples is less than S/2, the process checks to see if the size of A' is greater than or equal to a minimum number of positive examples required (in an example implementation, about 5,000 samples) (step 412). If it is, then S is reset to twice the number of positive examples that actually exist (step 414). If the number of positive examples is only slightly less than the minimum number required, then existing positive examples in the dataset are duplicated until the minimum number of positive examples required is reached (step 416), and S is set to that minimum number (step 414).

The auto-label component 310 then samples A' to create S/2 positive examples for training set 312 (step 418). In some implementations, this step may include downsampling frequently found keywords and/or intensifying rarer keywords (as determined by FD) in creating the set of positive examples A', so that the effect of rarer keywords is not swamped by that of more frequent ones. The next step is to create a negative (off-topic) dataset A" (step 420). In some implementations, the negative dataset A" does not necessarily include all examples in pool A that are not in A'—sometimes other rules may exclude some items from both pools, for example in order to balance the sizes of A' and A". A set of S/2 negative training examples (that are considered by the keyword topic classifier to be off-topic) is selected from A" and, in some implementations, possibly from members of pool A that are not in either A' or A" (step 422). There are generally enough negative training examples in the dataset that it is not necessary to check that S/2 examples exist, but similar principles to those described above may be used in the rare case that there are not enough negative training examples to create training set 312. Selected on-topic and off-topic examples are then combined to form training set 312, which consists of the S/2 negative examples and the S/2 positive examples (step 424). While this process is described for creation of a training set including roughly equal numbers of on-topic and off-topic examples, in other implementations, a different ratio of on-topic to off-topic examples may be selected.

Returning to FIG. 3, in some implementations, some feedback entries 104 are reserved for use of the coverage metric 314 and/or for manual validation 382 as described below and are not included in pool A or in training set 312. Training set 312 will used by model building component 316 to create one or more ML classifiers 318, as further described below. If user 304 does not wish to create a ML classifier (or if the ML classifiers 318 are found to be of inferior quality to the original keyword search, discussed below in connection with classifier decision 324), keyword topic classifier 308 may be deployed directly via model deployment service 326 in a deployed model 328. In this case, keyword topic classifier 308 becomes one of the keyword-based opportunities shown above in FIG. 2.

Otherwise, model building component 316 uses ML techniques to create one or more deep learning classifiers 318. In one implementation, model building component 316 uses the common technique of transfer learning based on the BERT model, a neural network-based approach to natural language processing, but any suitable ML algorithm may be substituted for this model. The BERT model is described in Devlin, et al., "BERT: Pre-training of Deep Bidirectional Transformers for Language Understanding," arXiv: 1810.04805 (2018), which is incorporated by reference herein to the extent not inconsistent herewith. In one implementation, building component 316 takes the BERT model and appends a single linear layer to perform classification, and the resulting classification neural network is then trained on training set 312. The result of training for N epochs is N different classifier checkpoints, each of which is a fully functioning ML classifier 318. Although each of these checkpoints is built from the same data using the same learning configuration, they differ in that each has seen the data more or fewer times than all other checkpoints, resulting in different model weights and different behavior when classifying data. In this implementation, all of the created classifiers 318 are passed out of the model building component 316 for evaluation by metric comparison component 320, since there is no way to know beforehand which will perform best, but in other implementations, fewer than all of the created classifiers 318 may be passed out of model building components 316 for evaluation. In one implementation, fifteen checkpoints are created at this stage, although those of ordinary skill in the art will recognize that more or fewer may be appropriate depending on characteristics of the feedback corpus, the ML model used, and the amount of computing power available for the task. In some implementations, these ML training tasks may be performed on graphics processing units (GPUs), rather than standard central processing units (CPUs), because of the amount of parallel computation required for neural network processing. In some implementations, model building component 316 may use other known natural language processing techniques to create classifiers 318, and/or may allow for a "hyperparameter tuning," where the model produces N different sets of checkpoints for each of N different hyperparameter settings (configurations of the model that together with the training set 312 influence how the model performs).

Metrics for testing classifiers 308, 318 with metric comparison component 320 may include, for example, precision and recall scores. Precision measures how likely it is that a particular feedback entry 104 matched by classifier 308, 318 is actually related to the desired topic (high precision means few false positives). Recall measures how likely it is that a feedback entry 104 that is related to the desired topic will be matched by the classifier 308, 318 (high recall means few false negatives). A coverage score may also be determined for ML classifiers 318, comparing how many pertinent feedback items that were not matched by keyword topic classifier 308 are matched by an ML classifier 318. These metrics are determined using a supervised testset 330, constructed as described below.

In some implementations, user 304 already has a validated test sample to provide for comparing metrics for keyword topic classifier 308 and for ML classifiers 318, which he provides to metric comparison component 320. In other implementations, user 304 must also validate a test sample to be used for measuring classifiers 308, 318 as described below. A validation test sample 332 is drawn from non-train data 314, which was not included in pool A described above. It is important that data that was not used for creating ML classifiers 318 be used for the validation test sample 332 to accurately test ML classifiers 318. User 304 specifies a desired number of test samples, which may in some implementations be around 200 samples. Metric comparison component 320 generates a validation set of the requested number of examples for user 304 to review, using a method substantially similar to the method for creating training set 312 described above. For example, in some implementations, metric comparison component 320 downsamples the number of positive examples including frequent keywords and intensifies the number of positive examples including rarer keywords. User 304 manually determines for each member of the validation set whether the feedback is on-topic or off-topic for the topic being trained. The validation set along with these user determinations forms supervised testset 330. If user 304 has also manually created test set items for the topic, they may be added to testset 330.

In some preferred implementations, each of the classifiers 308, 318 is run on each member of the validation test sample 332 to compute precision, recall, and coverage, while in other implementations, fewer metrics may be used. If fewer metrics are used, precision may commonly be favored over recall, but those of ordinary skill in the art will understand the most important metrics for any particular implementation. Other metrics besides precision, recall, and coverage may be used without departing from the scope of the process and tools described herein.

Performance of keyword topic classifier 308 and of ML classifiers 318 may be viewed by user 304 in a classifier comparison user interface (UI) 322, or metric comparison component 320 may simply select the best of ML classifiers 318 on the basis of precision, recall, and/or coverage scores. In some implementations, metric comparison component 320 may select a few of the best ML classifiers (for example, the three best ML classifiers) to present to user 304 along with keyword topic classifier 308. Either metric comparison component 320 or user 304 then selects one classifier (step 324) to be associated with the topic in the topic tracking tool, described below in connection with FIG. 5. The selected classifier 308, 318 is then passed to model deployment service 326, which incorporates it into deployed model 328 for use in the topic tracking tool. In some implementations, user 304 may be allowed (or required) to write a description of the topic, which will be displayed with the topic when it is browsed by a second user (who may not be an expert user).

Figure 5:
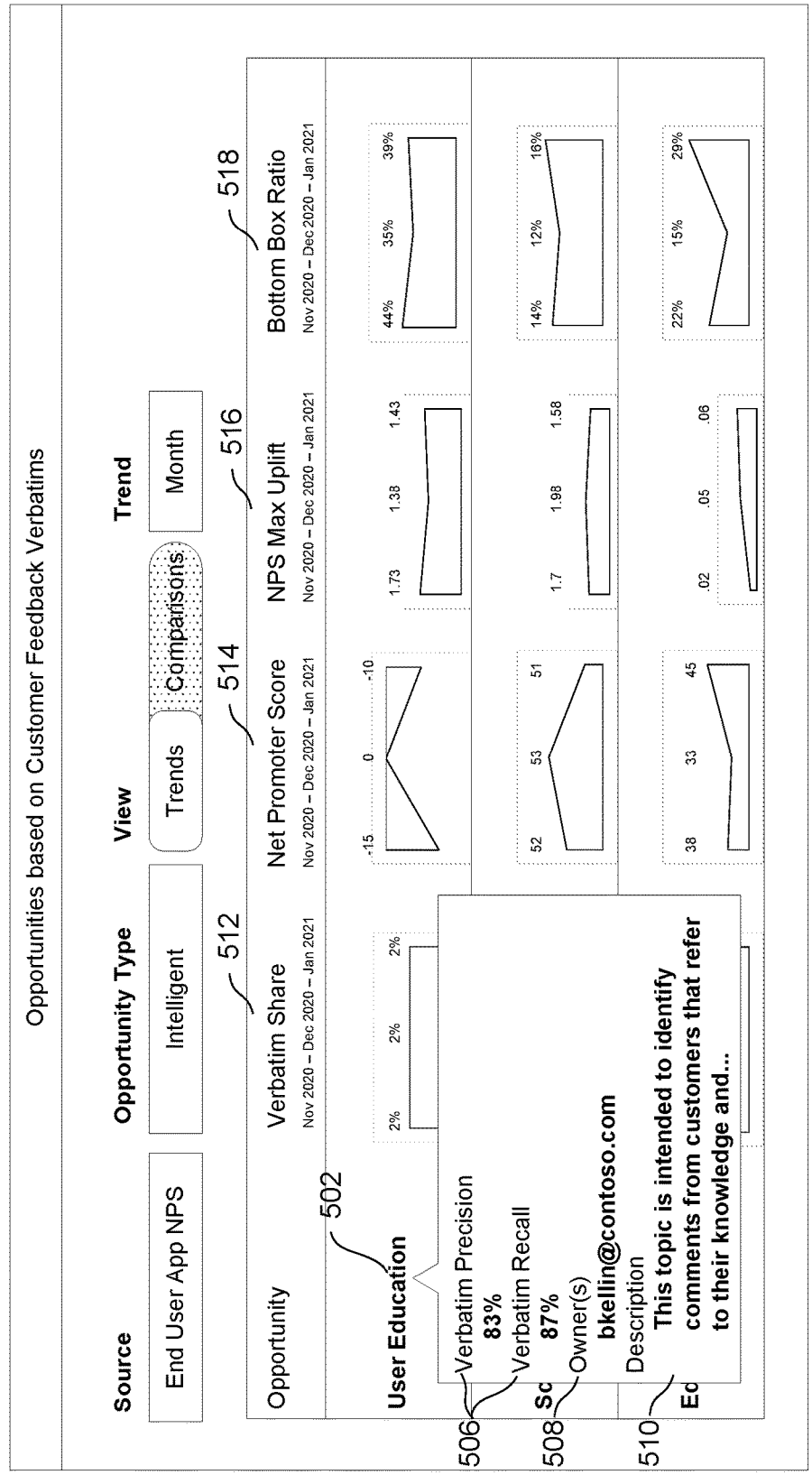
FIG. 5 shows a UI for browsing ML classifier-categorized opportunities in a feedback database.

FIG. 5 shows a UI 500 for browsing ML classifiers created by the process of FIG. 3. UI 500 is very similar to the UI shown in FIG. 2, and in some implementations, essentially the same UI may be used to browse both types of classifiers. Again, the first column lists opportunities 502. Hovertip 504 shows additional information about a classifier, but the information displayed is different. In the place of a keyword list, hovertip 504 shows precision and recall values 506 for the opportunity. It also shows the creator (or owner) 508 of the opportunity, and a description 510, preferably written by the creator as described above. Other elements of FIG. 5, such as the share of verbatims found by the classifier 512, the net promoter score 514, the NPS max uplift 516, and the bottom box score 518, are shown as they were in FIG. 2. In one implementation, the UI 500 does not allow a nonexpert user to directly create a new intelligent (ML) opportunity; these are only created using the process shown in FIG. 3. Thus, the "Track New Opportunity" button may be absent in this view, or if present, it may allow only creating a keyword-based opportunity as it did in FIG. 2. For computational efficiency, in some implementations, rather than performing a live search as described in connection with the keyword-based classifiers of FIG. 2, an automated process may search the database using a selected classifier for opportunity 502 to determine metrics for a set of matching feedback entries on a regular basis, such as hourly, daily, or at any other appropriate interval. For example, if many feedback entries enter the database during a particular time interval (such as during business hours), the automated process may run more frequently during this time interval.

Figure 6:
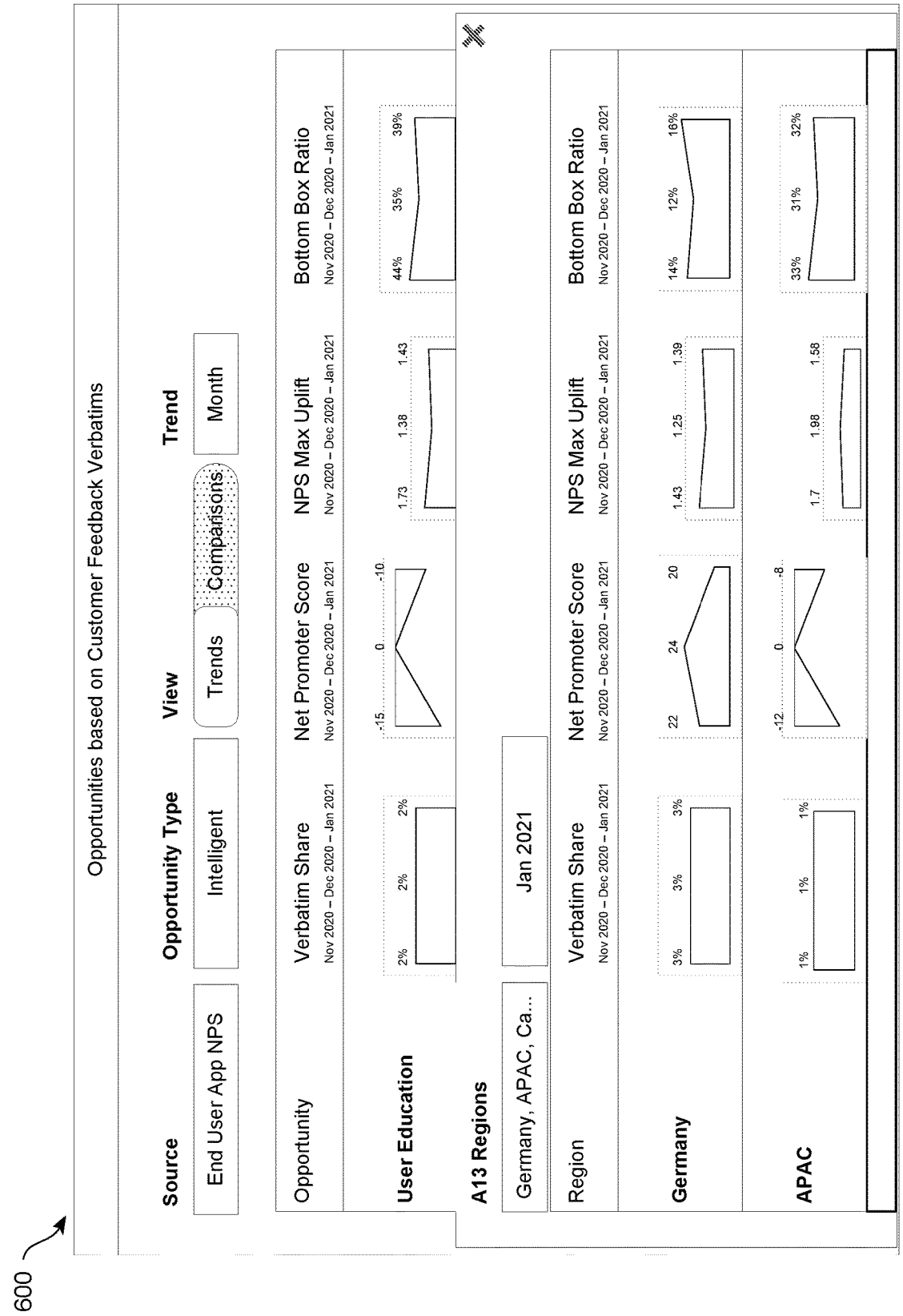
FIG. 6 shows a UI for sub-segment analysis of classifier-categorized opportunities in a feedback database.

In some implementations of examining either keyword-based opportunities as shown in FIG. 2, or ML classifier-based opportunities as shown in FIG. 5, a user may also perform a subsegment analysis, breaking matching verbatims out according to a pivot category. For example, a user may compare feedback items received in different countries, from users holding different licenses, users from different company sizes, users using different languages, etc. FIG. 6 shows a UI 600 for analyzing feedback items separated by geographic region. In the upper part of the figure, an "intelligent opportunity" (one based on an ML classifier) named "User Education" is shown, with the same types of monthly graphs that can be seen in FIG. 2 or FIG. 5. A user has selected to view this data split by region, opening a new window visible in the bottom part of the figure. In this view, each line represents a different region. It can be seen, for example, that the bottom box ratio values have roughly similar profiles for Germany and for the Asia-Pacific region, but the absolute values differ significantly (and are both less than the absolute values for all regions), which may provide useful information for trends in each area. Similar breakdowns could be created for language or for different user licenses, for example, by choosing a different pivot category.

Figure 7:
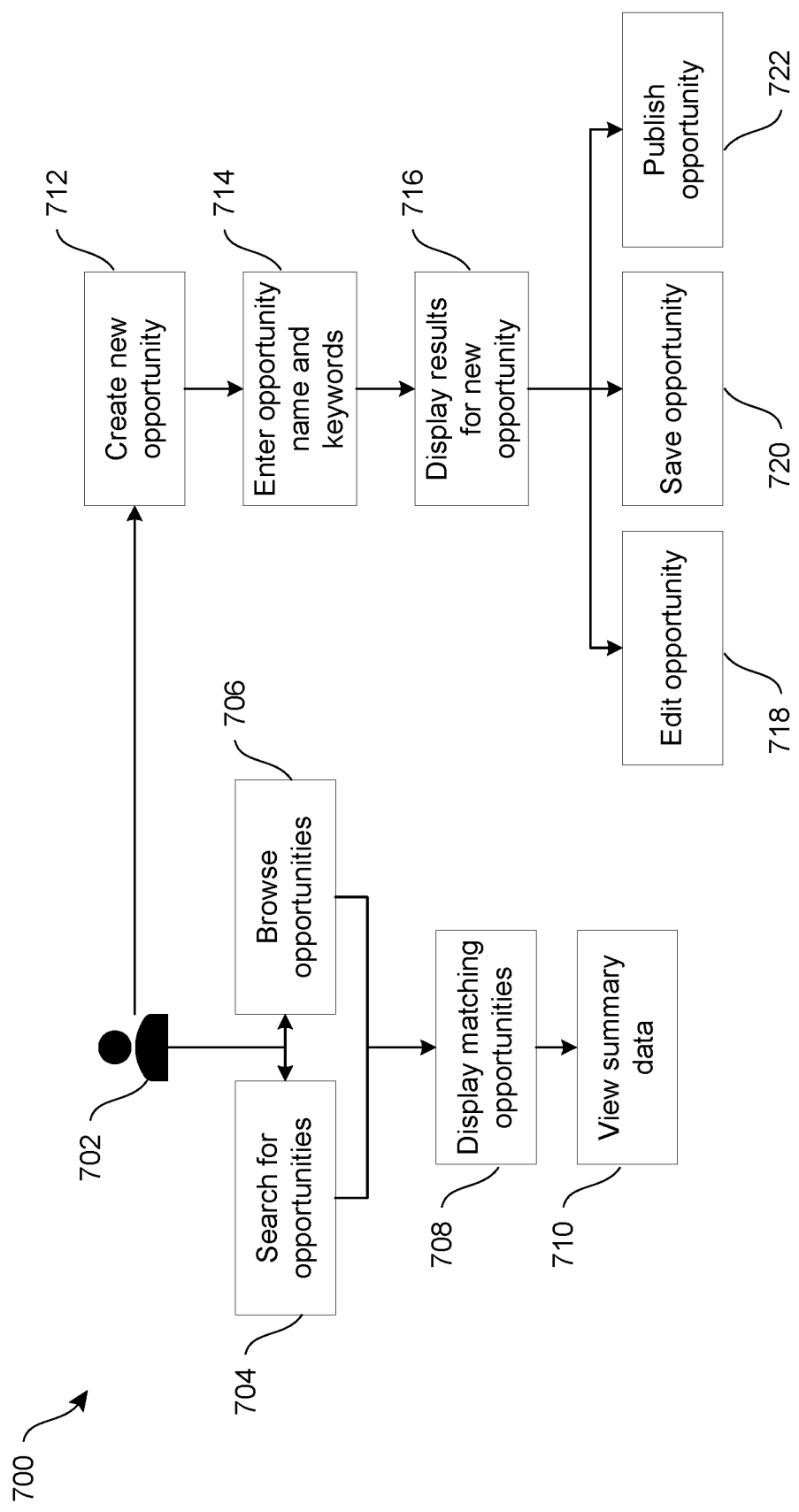
FIG. 7 is a flow diagram showing steps of using a system for examining opportunities related to a database.

FIG. 7 is a flow diagram 700 showing how a user 702 (such as a nonexpert user) may use the UIs shown in FIG. 2, FIG. 5, and FIG. 6. User 702 begins by searching for opportunities of a particular type (step 704) by using a standard text-based search, or by browsing opportunities instead of searching (step 706). These steps may return a mix of keyword-based opportunities and/or "intelligent" (ML) opportunities, which are displayed to the user (step 708) as shown in FIG. 2 and FIG. 5. User 702 may view summary data for each displayed opportunity (step 710). As explained above, for keyword-based opportunities, summary tooltip 204 may include a list of keywords, an owner of the opportunity (who may or may not be the creator of the opportunity), and a creation date and time for the opportunity. For intelligent opportunities, summary tooltip 404 may be different, and may include an owner 408 of the opportunity (who may or may not be the creator of the opportunity), a description 410 of the opportunity, and metrics 406 for the opportunity. As described above, in some implementations, when an intelligent opportunity is returned, summary data may be based on a saved search that is updated periodically, while when a keyword-based opportunity is returned, the system may perform the associated search and display real-time summary data.

If user 702 does not find a desired opportunity by searching or by browsing, the next step is to create a new opportunity (step 712), by selecting a "track new opportunity" button 218, 520. This button takes user 702 to a UI for naming the new opportunity and for entering keywords (step 714). When these have been entered, the system searches customer feedback database 302 and displays the new opportunity (step 716) results. As shown in FIG. 2 and FIG. 5, the display may include metrics such as verbatim share, net promoter score, NPS max uplift, and/or bottom box ratio. In some implementations, user 702 is then given the option to edit keywords and/or title (step 718), to save the opportunity for personal use (step 720), or to publish the opportunity (step 722). If user 702 chooses to save the opportunity for personal use, it may be included in browsable or searchable opportunities for that user in the future. If user 702 choose to publish the opportunity, it may be included in browsable or searchable opportunities for all users in the future. In some implementations, user 702 may be able to publish opportunities only to certain other users or groups of users.

Figure 8:
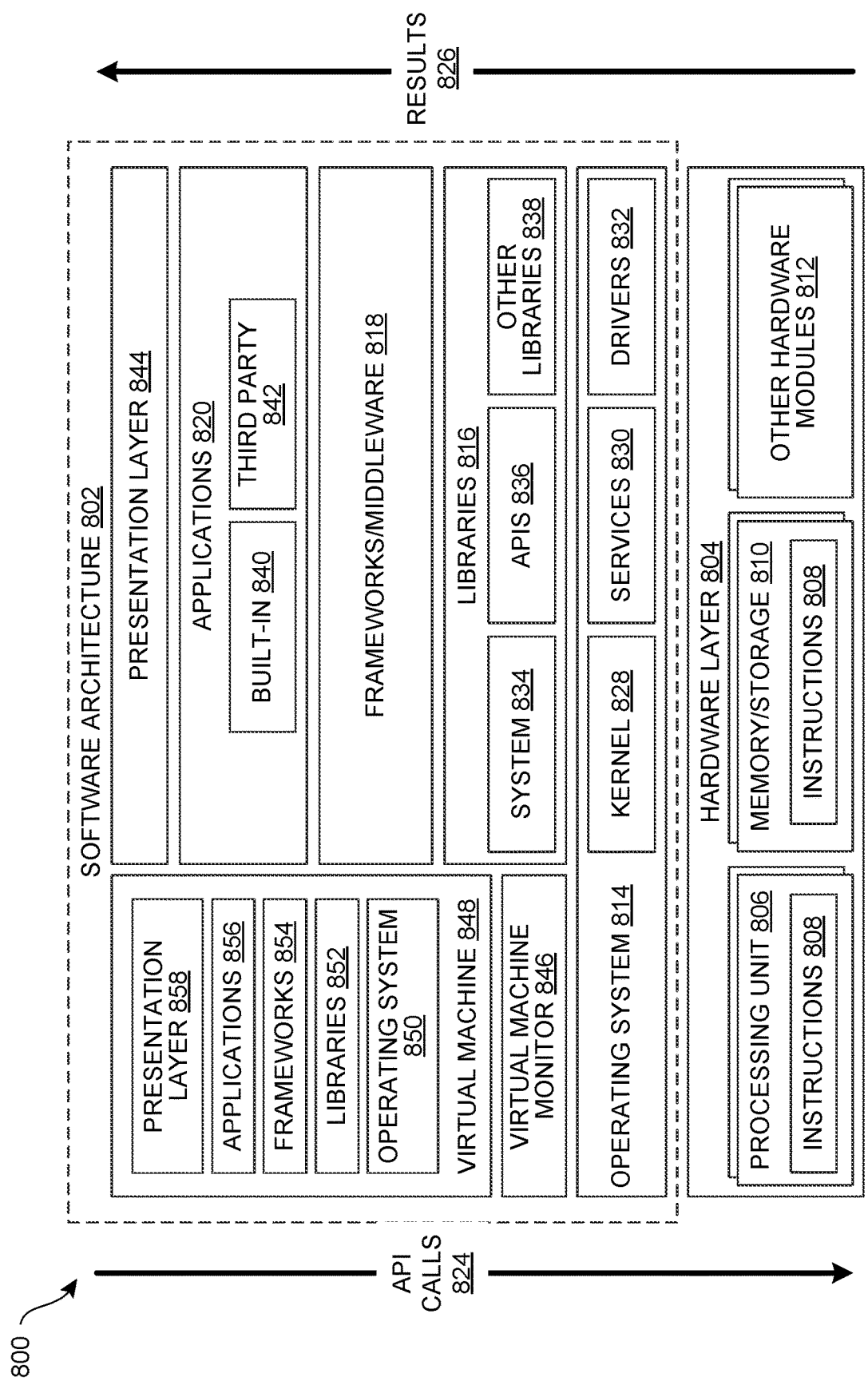
FIG. 8 is a block diagram of an example computing device, which may be used to provide implementations of the systems and methods described herein.

FIG. 8 is a block diagram 800 illustrating an example software architecture 802, various portions of which may be used in conjunction with various hardware architectures herein described, which may implement any of the above-described features. FIG. 8 is a non-limiting example of a software architecture and it will be appreciated that many other architectures may be implemented to facilitate the functionality described herein. The software architecture 802 may execute on hardware such as the data processing system running the methods of FIG. 3 that may include, among other things, document storage, processors, memory, and input/output (I/O) components. A representative hardware layer 804 is illustrated and can represent, for example, the devices described herein. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 808 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine. The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
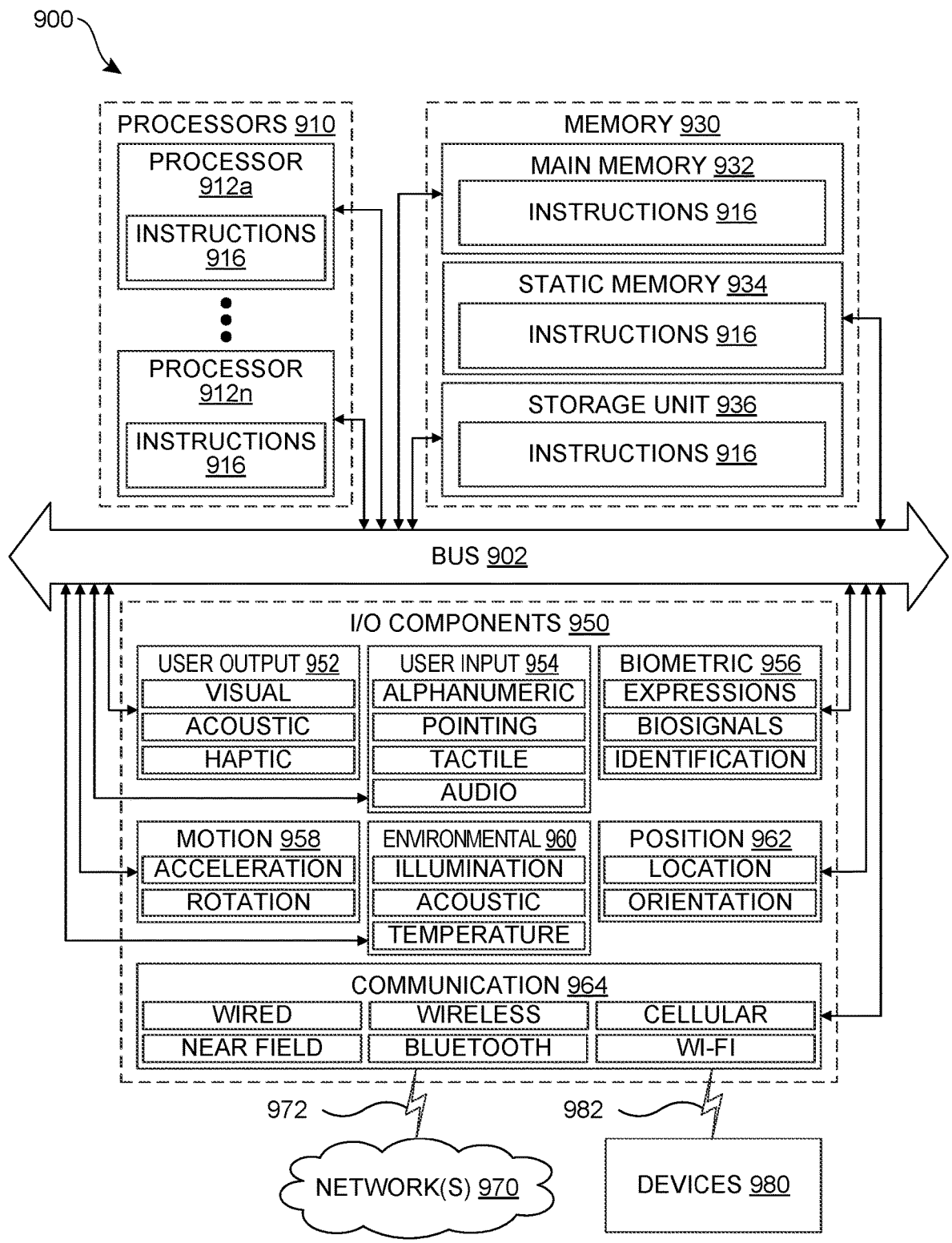
FIG. 9 is a block diagram illustrating components of an example machine configured to read instructions from a machine-readable medium.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing unit (CPU), a graphics processing unit (GPU), a digital signal processor (DSP), an ASIC, or a suitable combination thereof) may include one or more processors 912a to 912n that may execute the instructions 916 and process data. In some examples, one or more processors 910 may execute instructions provided or identified by one or more other processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956 and/or position components 962, among a wide array of other environmental sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 962, such as, but not limited to, geo-location via Internet Protocol (IP) address, location via Wi-Fi, cellular, NFC, Bluetooth, or other wireless station identification and/or signal triangulation.

In the following, further features, characteristics and advantages of the invention will be described by means of items:

Item 1: A system for creating a machine-learning classifier for a database, including a processor and machine-readable media including instructions. The instructions, when executed by the processor, cause the processor to accept a topic name and a set of keywords from a user, create a keyword topic classifier based on the set of keywords, process the keyword topic classifier with a labelling component to automatically create a training data set, provide the training data set to a model-building component, use the model-building component to create a machine-learning classifier from the provided training data set, display to the user a metric for the machine-learning classifier and for the keyword topic classifier, the metric determined by determining at least a recall value and a precision value for each classifier using a human-created validation test sample, and accept a selection of a classifier from the user from the group consisting of the machine-learning classifier and the keyword topic classifier. The training data set includes a subset of entries in the database selected to include both positive examples and negative examples, and the model-building component is configured to use a machine-learning method to identify other search elements to include in the machine-learning classifier.

Item 2: The system of item 1, wherein the selected classifier is the machine-learning classifier, the machine-readable media further including instructions which, when executed by the processor, cause the processor to perform a search of the database using the selected classifier, and to store results of the search of the database associated with the selected classifier and the topic name for retrieval by a second user.

Item 3: The system of item 1 or 2, wherein storing the results of the search of the database further includes storing a description of the topic created by the user.

Item 4: The system of any of items 1-3, wherein the selected classifier is the keyword topic classifier, the machine-readable media further including instructions which, when executed by the processor, cause the processor to store the set of keywords and the topic name for retrieval by a second user.

Item 5: The system of any of items 1-4, wherein the human-validated test set is produced by selecting a sample of database entries not included in the training data set and presenting them to the user for classification.

Item 6: The system of any of items 1-5, wherein the model-building component is configured to create a plurality of machine-learning classifiers, and accepting a selection from the user of a classifier includes accepting one classifier from the group consisting of the plurality of machine-learning classifiers and the keyword topic classifier.

Item 7: The system of any of items 1-6, wherein the plurality of machine-learning classifiers are created by repeatedly running the machine-learning method on the training data set and by adding a newly generated machine-learning classifier to the plurality of machine-learning classifiers after each repetition.

Item 8: The system of any of items 1-7, wherein the model-building component is configured to use a transfer learning method.

Item 9: The system of any of items 1-8, wherein the training set includes all members of the set of keywords at a rate derived from their rate of occurrence in the database.

Item 10: A method of constructing a machine-learning classifier for a database, including accepting a topic name and a set of keywords from a user, creating a keyword topic classifier based on the set of keywords, processing the keyword topic classifier with a labelling component to automatically create a training data set, providing the training data set to a model-building component, using the model-building component to create a machine-learning classifier from the provided training data set, displaying to the user a metric for the machine-learning classifier and for the keyword topic classifier, and accepting a selection of a classifier from the user from the group consisting of the machine-learning classifier and the keyword topic classifier. The training data set includes a subset of entries in the database selected to include both positive examples and negative examples. The model-building component is configured to use a machine-learning method to identify other search elements to include in the machine-learning classifier. The metric is determined by determining at least a recall value and a precision value for each classifier using a human-created validation test sample.

Item 11: The method of item 10, wherein the selected classifier is the machine-learning classifier, the method further including performing a search of the database using the selected classifier and storing results of the search of the database associated with the selected classifier and the topic name for retrieval by a second user.

Item 12: The method of item 10 or 11, wherein storing the results of the search of the database further includes storing a description of the topic created by the user.

Item 13: The method of any of items 10-12, wherein the selected classifier is the keyword topic classifier, the method further comprising storing the set of keywords and the topic name for retrieval by a second user.

Item 14: The method of any of items 10-13, wherein the human-validated test sample is produced by selecting a sample of database entries not included in the training data set and presenting them to the user for classification.

Item 15: The method of any of items 10-14, wherein the model-building component is configured to create a plurality of machine-learning classifiers, and wherein the step of accepting a selection from the user of a classifier includes accepting one classifier from the plurality of machine-learning classifiers and the keyword topic classifier.

Item 16: The method of any of items 10-15, wherein the plurality of machine-learning classifiers are created by repeatedly running the machine-learning method on the training data set and by adding a newly generated machine-learning classifier to the plurality of machine-learning classifiers after each repetition.

Item 17: The method of any of items 10-16, wherein the model-building component is configured to use a transfer learning method.

Item 18: The method of any of items 10-17, wherein the training set includes all members of the set of keywords at a rate derived from their rate of occurrence in the database.

Item 19: A system for storing, in a classifier database, machine learning (ML) classifiers pertaining to text entries in a text source database, the system including a processor and machine-readable media including instructions. The instructions, when executed by the processor, cause the processor to access an existing ML classifier by accepting a search request from a first user for a classifier database entry, searching the classifier database for classifiers matching the accepted search request, returning a list of stored classifiers matching the search request, accepting a selection by the user of a stored classifier from the list of stored classifiers matching the search request, and displaying the selected classifier to the first user. The instructions, when executed by the the processor, further cause the processor to create a new ML classifier by accepting a topic name and a set of keywords from a second user, creating a keyword topic classifier based on the set of keywords, processing the keyword topic classifier with a labelling component to automatically create a training data set, providing the training data set to a model-building component, using the model-building component to create a machine-learning classifier from the provided training data set, displaying to the second user a metric for the machine-learning classifier and for the keyword topic classifier, accepting a selection of a classifier from the second user from the group consisting of the machine-learning classifier and the keyword topic classifier, and storing the selected classifier in the classifier database. The training data set includes a subset of entries in the text source database selected to include both positive examples and negative examples. The model-building component is configured to use a machine-learning method to identify other search elements to include in the machine-learning classifier. The metric is determined by determining at least a recall value and a precision value for each classifier using a human-created validation test sample.

Item 20: The system of item 19, wherein the text source database is a feedback database.

Item 21: A system for viewing search results in a database, including a processor and machine-readable media. The machine-readable media include instructions which, when executed by the processor, cause the processor to display in a user interface (UI) a plurality of topics relevant to the database, the plurality of topics including a keyword-based topic which is connected to a predetermined list of keywords and a machine-learning-based topic which is connected to a stored machine-learning classifier, and for at least one displayed topic, perform the following steps: if the displayed topic is a keyword-based topic, perform a search of the database for the predetermined list of keywords and display the results of the search to a user, and if the displayed topic is a machine-learning-based topic, retrieve stored results of the stored machine-learning classifier and display the stored results to the user.

Item 22: The system of item 21, wherein the stored results of the stored machine-learning algorithm have been generated by the following steps: accepting a topic name and a set of keywords from a second user; creating a keyword topic classifier based on the set of keywords; processing the keyword topic classifier with a labelling component to automatically create a training data set, wherein the training data set includes a subset of entries in the database selected to include both positive examples and negative examples; providing the training data set to a model-building component; using the model-building component to create a machine-learning classifier from the provided training data set, the model-building component being configured to use a machine-learning method to identify other search elements to include in the machine-learning classifier; displaying to the second user a metric for the machine-learning classifier and for the keyword topic classifier, the metric determined by determining at least a recall value and a precision value for each classifier using a human-created validation test sample; and accepting a selection of a classifier from the second user from the group consisting of the machine-learning classifier and the keyword topic classifier.

Item 23: The system of item 21 or 22, wherein retrieving stored results of the stored machine-learning classifier further comprises retrieving a description of the topic created by the second user.

Item 24: The system of any of items 21-23, wherein the machine-readable media further include instructions that, when performed by the processor, cause the processor to repeat on a predetermined schedule the steps of performing a search of the database using the stored machine-learning classifier, and storing results of the search of the database using the stored machine-learning classifier and the topic name.

Item 25: The system of any of items 21-24, wherein the machine-readable media further include instructions that, when performed by the processor, cause the processor to accept a new keyword list from the user, perform a search of the database for the new keyword list, and display results of the search to the user.

Item 26: The system of any of items 21-25, wherein the machine-readable media further include instructions that, when performed by the processor, cause the processor to save the new keyword list for future retrieval by the user.

Item 27: The system of any of items 21-26, wherein the machine-readable media further include instructions that, when performed by the processor, cause the processor to publish the new keyword list for access by another user and display the new keyword list and results of a second database search for the new keyword list to the another user.

Item 28: A method for viewing search results in a database, comprising displaying in a user interface (UI) a plurality of topics relevant to the database, the plurality of topics including a keyword-based topic which is connected to a predetermined list of keywords and a machine-learning-based topic which is connected to a stored machine-learning classifier; and for at least one displayed topic, performing the following steps: If the displayed topic is a keyword-based topic, performing a search of the database for the predetermined list of keywords and displaying the results of the search to a user, and if the displayed topic is a machine-learning-based topic, retrieving stored results of the stored machine-learning classifier and displaying the stored results to the user.

Item 29: The method of item 28, wherein the stored results of the stored machine-learning algorithm have been generated by the following steps: accepting a topic name and a set of keywords from a second user; creating a keyword topic classifier based on the set of keywords; processing the keyword topic classifier with a labelling component to automatically create a training data set; wherein the training data set includes a subset of entries in the database selected to include both positive examples and negative examples; providing the training data set to a model-building component; using the model-building component to create a machine-learning classifier from the provided training data set, the model-building component being configured to use a machine-learning method to identify other search elements to include in the machine-learning classifier; displaying to the second user a metric for the machine-learning classifier and for the keyword topic classifier, the metric determined by determining at least a recall value and a precision value for each classifier using a human-created validation test sample; and accepting a selection of a classifier from the second user from the group consisting of the machine-learning classifier and the keyword topic classifier.

Item 30: The method of item 28 or 29, wherein retrieving stored results of the stored machine-learning classifier further comprises retrieving a description of the topic created by the second user.

Item 31: The method of any of items 28-30, further comprising repeating on a predetermined schedule the steps of: performing a search of the database using the stored machine-learning classifier; and storing results of the search of the database using the stored machine-learning classifier and the topic name.

Item 32: The method of any of items 28-31, further including accepting a new keyword list from the user, performing a search of the database for the new keyword list, and displaying results of the search to the user.

Item 33: The method of any of items 28-32, further including saving the new keyword list for future retrieval by the user.

Item 34: The method of any of items 28-23, further comprising publishing the new keyword list for access by another user and displaying the new keyword list and results of a second database search for the new keyword list to the another user.

Item 35: A system for accessing, in a classifier database, machine learning classifiers pertaining to text entries in a text source database, the system including a processor and machine-readable media including instructions. The instructions, when executed by the processor, cause the processor to: receive from a user a request to search for ML classifiers relating to a specific topic; search the classifier database for ML classifiers matching the request to create a list of ML classifiers; send to the user the created list of ML classifiers; receive from the user a selected member of the created list of ML classifiers; and send to the user stored results of a search of the text source database using the selected member.

Item 36: The system of item 35, wherein the machine-readable media further include instructions that, when performed by the processor, cause the processor to repeat on a predetermined schedule steps of searching the text source database using a ML classifier stored in the classifier database, and storing results of searching the text source database.

Item 37: The system of item 35 or 36, wherein the classifier database further includes a plurality of keyword topic classifiers, the machine-readable media further including instructions that, when performed by the processor, cause the processor to: receive from the user a request to search for keyword topic classifiers; search the classifier database for keyword topic classifiers matching the request to search for keyword topic classifiers to create a list of keyword topic classifiers; send to the user the created list of keyword topic classifiers; receive from the user a selected member of the created list of keyword topic classifiers; perform a search of the text source database for the selected member of the created list of keyword topic classifiers; and send to the user results of the search of the text source database.

Item 38: The system of any of items 35-37, wherein the machine-readable media further include instructions that, when performed by the processor, cause the processor to search the classifier database for ML classifiers and for keyword topic classifiers to create a list containing an ML classifier and a keyword topic classifier and send to the user the created list containing an ML classifier and a keyword topic classifier.

Item 39: The system of any of items 35-38, wherein the machine-readable media further include instructions that, when performed by the processor, cause the processor to: receive from the user a selected member of the created list containing an ML classifier and a keyword topic classifier; if the selected member is an ML classifier, send to the user stored results of a search of the text source database using the selected member; and if the selected member is a keyword topic classifier: perform a search of the text source database for the selected member of the created list of keyword topic classifiers and send to the user results of the search of the text source database.

Item 40: The system of any of items 35-39, wherein the machine-readable media further include instructions that, when performed by the processor, cause the processor to perform a search of the text source database using the selected member of the created list of ML classifiers and send to the user results of the search of the text source database.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for viewing search results in a database, comprising:
   a processor; and
   machine-readable media including instructions which, when executed by the processor, cause the processor to:
      display in a user interface a plurality of topics relevant to the database, the plurality of topics including:
         a keyword-based topic manually selected with a list of keywords by one first user to generate a keyword topic classifier that classifies an entry in the database as pertinent to the keyword-based topic by checking whether the entry contains a word in the list of keywords, wherein the first user is a subject matter expert regarding the keyword-based topic; and
         a machine-learning-based topic associated with a machine-learning classifier, the machine-learning classifier generated based on a training data set that was automatically labelled by running the keyword topic classifier on a subset of entries in the database; and
      for at least one displayed topic:
         if the displayed topic is a keyword-based topic, perform a search of the database for the list of keywords and display the results of the search to a second user together with at least one of (1) an identifier of the first user, (2) a time that the keyword-based topic was manually selected, or (3) one or more database entry verbatim metrics along a timeline for the keyword topic classifier; and
         if the displayed topic is a machine-learning-based topic, retrieve stored results of the machine-learning classifier and display the stored results to the second user together with at least one of (1) the identifier of the first user, (2) a time when the machine-learning-based topic was created, or (3) one or more database entry verbatim metrics along a timeline for the machine-learning classifier.

2. The system of claim 1, wherein the training data set includes a subset of entries in the database selected to include both positive examples and negative examples pertinent to the keyword-based topic, and wherein the stored results of the machine-learning classifier have been generated by the following steps:
   displaying to the first user a metric for the machine-learning classifier and for the keyword topic classifier, the metric determined by determining at least a recall value and a precision value for each classifier using a human-created validation test sample;
   accepting a selection of a classifier from the first user from the group consisting of the machine-learning classifier and the keyword topic classifier; and
   storing a topic name and a list of keywords associated with the selected classifier for retrieval by the second user,
   wherein the one or more database entry verbatim metrics include at least one of a verbatim share, a net promoter score (NPS), a NPS max uplift, or a bottom box ratio.

3. The system of claim 1, wherein the stored results is displayed to the second user further with a description of the keyword-based topic manually selected by the first user.

4. The system of claim 1, wherein the machine-readable media further include instructions that, when performed by the processor, cause the processor to repeat on a predetermined schedule the steps of:
   performing a search of the database using the machine-learning classifier; and
   storing results of the search of the database using the machine-learning classifier and the machine-learning-based topic.

5. The system of claim 1, wherein the machine-readable media further include instructions that, when performed by the processor, cause the processor to:
   accept a new keyword list from the second user;
   perform a search of the database for the new keyword list; and
   display results of the search to the second user.

6. The system of claim 5, wherein the machine-readable media further include instructions that, when performed by the processor, cause the processor to:
   save the new keyword list for future retrieval by the second user.

7. The system of claim 5, wherein the machine-readable media further include instructions that, when performed by the processor, cause the processor to:
   publish the new keyword list for access by a third user; and
   display the new keyword list and results of a second database search for the new keyword list to the third user.

8. A method for viewing search results in a database, comprising:
   displaying in a user interface a plurality of topics relevant to the database, the plurality of topics including:
      a keyword-based topic manually selected with a list of keywords by one first user to generate a keyword topic classifier that classifies an entry in the database as pertinent to the keyword-based topic by checking whether the entry contains a word in the list of keywords, wherein the first user is a subject matter expert regarding the keyword-based topic; and
      a machine-learning-based topic associated with a machine-learning classifier, the machine-learning classifier generated based on a training data set that was automatically labelled by running the keyword topic classifier on a subset of entries in the database; and for at least one displayed topic:

if the displayed topic is a keyword-based topic, performing a search of the database for the list of keywords and display the results of the search to a second user together with at least one of (1) an identifier of the first user, (2) a time that the keyword-based topic was manually selected, or (3) one or more database entry verbatim metrics along a timeline for the keyword topic classifier; and if the displayed topic is a machine-learning-based topic, retrieving stored results of the machine-learning classifier and display the stored results to the second user together with at least one of (1) the identifier of the first user, (2) a time when the machine-learning-based topic was created, or (3) one or more database entry verbatim metrics along a timeline for the machine-learning classifier.

9. The method of claim 8, wherein the training data set includes a subset of entries in the database selected to include both positive examples and negative examples pertinent to the keyword-based topic, and wherein the stored results of the machine-learning classifier have been generated by the following steps:

displaying to the first user a metric for the machine-learning classifier and for the keyword topic classifier, the metric determined by determining at least a recall value and a precision value for each classifier using a human-created validation test sample;

accepting a selection of a classifier from the first user from the group consisting of the machine-learning classifier and the keyword topic classifier; and storing a topic name and a list of keywords associated with the selected classifier for retrieval by the second user.

10. The method of claim 8, wherein the stored results is displayed to the second user further with a description of the keyword-based topic manually selected by the first user.

11. The method of claim 8, further comprising repeating on a predetermined schedule the steps of:

performing a search of the database using the machine-learning classifier; and storing results of the search of the database using the machine-learning classifier and the machine-learning-based topic.

12. The method of claim 8, further comprising:

accepting a new keyword list from the second user;

performing a search of the database for the new keyword list; and displaying results of the search to the second user.

13. The method of claim 12, further comprising:

saving the new keyword list for future retrieval by the second user.

14. The method of claim 12, further comprising:

publishing the new keyword list for access by a third user; and displaying the new keyword list and results of a second database search for the new keyword list to the third user.

15. A system for accessing, in a classifier database, machine learning (ML) classifiers pertaining to text entries in a text source database, the system comprising:

a processor; and machine-readable media including instructions which, when executed by the processor, cause the processor to:

receive from a first user a request to search for ML classifiers relating to a machine-learning-based topic, wherein at least one of the ML classifiers was generated based on a training data set that was automatically labelled by running a first keyword topic classifier on a subset of text entries in the text source database, and the first keyword topic classifier was created based on a keyword-based topic manually selected with a list of keywords by one second user to generate the first keyword topic classifier that classifies a text entry in the text source database as pertinent to the keyword-based topic by checking whether the text entry contains a word in the list of keywords, wherein the second user is a subject matter expert regarding the keyword-based topic;

search the classifier database for ML classifiers matching the request to create a list of ML classifiers;

send to the first user the created list of ML classifiers;

receive from the first user a selected ML classifier of the created list of ML classifiers;

send to the first user stored results of a search of the text source database using the selected ML classifier; and display to the first user the stored results with at least one of (1) an identifier of the second user, (2) a time when the machine-learning-based topic was created, or (3) one or more database entry verbatim metrics along a timeline for the selected ML classifier.

16. The system of claim 15, wherein the machine-readable media further include instructions that, when performed by the processor, cause the processor to:

repeat on a predetermined schedule steps of:

searching the text source database using the at least one ML classifier in the classifier database; and storing results of searching the text source database, wherein the training data set includes a subset of entries in the text source database selected to include both positive examples and negative examples pertinent to the keyword-based topic, wherein the selected ML classifier is created from the training data set using a model-building component, and the model-building component is configured to use a machine-learning method to identify other search elements to include in the selected ML classifier, wherein a metric for the selected ML classifier and for the keyword topic classifier is displayed to the second user, and the metric is determined by at least a recall value and a precision value for each classifier using a human-created validation test sample, and wherein a selection of a classifier is received from the second user from the group consisting of the selected ML classifier and at least one of the keyword topic classifiers, and a topic name and a list of keywords associated with the selected classifier are stored for retrieval by the first user.

17. The system of claim 15, wherein the classifier database further includes a plurality of keyword topic classifiers, the machine-readable media further including instructions that, when performed by the processor, cause the processor to:

receive from the first user a request to search for keyword topic classifiers;

search the classifier database for keyword topic classifiers matching the request to search for keyword topic classifiers to create a list of keyword topic classifiers;

send to the first user the created list of keyword topic classifiers;

receive from the first user a selected topic classifier of the created list of keyword topic classifiers;

perform a search of the text source database for the selected topic classifier of the created list of keyword topic classifiers; and send to the first user results of the search of the text source database.

18. The system of claim 17, wherein the machine-readable media further include instructions that, when performed by the processor, cause the processor to:

search the classifier database for ML classifiers and for keyword topic classifiers to create a list containing an ML classifier and a keyword topic classifier; and send to the first user the created list containing an ML classifier and a keyword topic classifier.

19. The system of claim 18, wherein the machine-readable media further include instructions that, when performed by the processor, cause the processor to:

receive from the first user a selected member of the created list containing an ML classifier and a keyword topic classifier;

if the selected member is an ML classifier, send to the first user stored results of a search of the text source database using the selected member; and if the selected member is a keyword topic classifier:

perform a search of the text source database for the selected member of the created list of keyword topic classifiers; and send to the first user results of the search of the text source database.

20. The system of claim 15, wherein the machine-readable media further include instructions that, when performed by the processor, cause the processor to:

perform a search of the text source database using the selected ML classifier of the created list of ML classifiers; and send to the user results of the search of the text source database.

\* \* \* \* \*